2,764,518

THERAPEUTIC MIXTURE OF CARBOXYLIC CATION EXCHANGE RESIN AND ITS COPPER SALT

Francis M. Thurmon, Boston, Mass., assignor to Rohm & Haas Company, Philadelphia, Pa., a corporation of Delaware No Drawing. Application September 30, 1953,
Serial No. 383,412

6 Claims. (Cl. 167—58)

This invention concerns therapeutic compositions which contain both insoluble copper carboxylate resin and insoluble carboxylic cation-exchange resin in hydrogen form. These compositions are useful in the treatment of mycotic infections.

While attempts have been made from time to time to employ the toxic properties of copper in therapeutic preparations, practical utilization has been quite limited. Its bactericidal action is far from being striking. Insoluble compounds are ineffective. Yet even five per cent solutions of soluble compounds are not toxic to many microorganisms and spores. Furthermore, soluble compounds are in general highly irritating and astringent.

It was observed that use of a carboxylic cation-exchange resin in the form of its copper salt was not particularly effective and, furthermore, it was irritating. The application of copper carboxylate resins appeared, therefore, as unpromising.

It was an unexpected discovery, therefore, that mixtures containing both copper carboxylate resin and carboxylic cation exchange resin in hydrogen form could be utilized with excellent results and without the irritation observed when only the ineffective copper carboxylate was used. It was surprisingly found that therapeutic preparations containing only two per cent of an insoluble carboxylic cation-exchange resin in the form of its copper salt together with at least two per cent of an insoluble carboxylic cation-exchange resin in its hydrogen form are therapeutically effective in external applications. Higher but limited concentrations of these resins can be used, there being difficulty, however, in setting any sharp upper limit to the percentage of copper resin which may be present in these preparations. It is preferred, however, to have present from 4% to 20% of a carboxylic resin in the form of its cupric salt, although as high a proportion as 40% has been indicated as possibly useful in extreme cases, depending in part upon the type and the formulation of the therapeutic preparation and upon the particular application. Such higher limit can be tolerated, for example, in a powder.

The carboxylic resin in its hydrogen form constitutes from 2% to 60% of the therapeutic preparation. There is preferably used from 2% or better 4% to 40% of carboxlic resin in acidic form, the amount chosen depending in part on the content of copper resin used and in part on the type and the formulation of the therapeutic preparation.

The two kinds of carboxylic resins are commingled in the form of powders, lotions, or ointments, being normally dispersed in solid, liquid, or pasty carriers. For any of these forms the resins should be in a finely divided state. Particle sizes less than 100 mesh are required and preferably both copper resin and carboxylic acid resin should pass at least a 250 mesh screen or better a 325 mesh screen. The two kinds of carboxylic resins can then be uniformly mixed with a solid carrier or well dispersed or suspended in liquids or pastes and efficiently and effectively applied. The therapeutic preparation has a pH of 3 to 5.5 or is adjusted to this pH range.

In the preparation of powders there may be used finely particled talc or clay, starch, zinc or magnesium stearate, and other conventionally used inert, water-insoluble, finely divided solids. Mixtures of such solids are commonly used. The solids may carry small amounts of normally liquid materials, such as humectants, oils, or greases. Tinting materials and perfumes may also be incorporated.

When lotions or ointments are desired, the two kinds of resin are dispersed in liquid or pasty vehicles. The resulting compositions may be varied from relatively thin or fluid products through creams to ointments and salves of different textures. It is usually preferred that the lotions be based on hydrophilic liquids or mixtures miscible with water. The ointments may be made with a hydrophilic base, a gelatinous aqueous paste, or other ointment base containing inert organic ingredients such as thickened mineral oils, petrolatum, or other conventional bases for salves, although it will be apparent that these are generally slower acting than preparations containing a hydrophilic base. This may be an advantage where prolonged, controlled action is desired.

The carriers for lotions, creams, and ointments may vary from glycerine, glycerine-starch, pastes, and dispersions of thickening agents such as tragacanth, karaya, quince seed gum, Irish moss, pectin, alginates, cellulose ethers, and polyethylene glycol waxes, through ointment bases made from stearic acid, cetyl alcohol, stearyl alcohol, lanolin, petroleum oils, spermaceti, petroleum waxes, white wax, or the like dispersed in an aqueous medium with ethanolamine soaps, glyceryl monolaurate, glycol monolaurate, glyceryl monostearate, polyglycerol-fatty acid condensates, and other emulsifying and dispersing agents, to petrolatum and oils thickened, for example, with polymers dispersed therein, such as polyethylene or polyacrylic resins. Other useful bases include methyl cellulose-glycerine pastes and bentonitic bases which are essentially neutral or not more acidic than pH 3.

The cation-exchange resins which are used depend for their activity upon the presence therein of the carboxy radical. In the acidic form this radical is, of course, —COOH. A multiplicity of such groups is present in the resin, being attached to a network which renders the resins insoluble. In the salt-form the functional groups hold metal ions, in this particular case, copper. The usual carboxylic acid resin has a pH between 3 and 5. If the pH should be lower, adjustment is made with sufficient of a base, such as sodium hydroxide, to bring the pH of the final preparation within the range of 3 to 5.5.

The exchange resins may be generally prepared from carboxylic acids or their anhydrides which have an unsaturated linkage through which they enter into polymerization or copolymerization with other compounds having polymerizable unsaturated linkages. The copolymer is rendered insoluble by including a polymerizable substance having at least two double bonds which are not conjugated and which thereby promote cross-linking. Thus, maleic anhydride and styrene may be copolymerized in the presence of a polyunsaturated compound, such as divinylbenzene, trivinylbenzene, ethylene diacrylate, or diallyl maleate, fumarate, or itaconate, or the like to give insoluble resins. Acrylic or methacrylic acid may likewise be copolymerized with a polyunsaturated compound to form insoluble cation-exchange resins.

The carboxy-containing copolymers are formed in the conventional way with the aid of a polymerization catalyst, such as benzoyl peroxide, lauroyl peroxide, tert.-butyl hydroperoxide, tert.-butyl perbenzoate, etc. The copolymer formed may be crushed to a fine powder. The insoluble carboxylic resins may also be formed by emulsion polymerization and then precipitated. Acid anhydride groups, when present in a copolymer, are converted to carboxy groups. If an alkali is used, the resulting salt form is readily converted to the acid form by washing with an aqueous acid. The alkali metal salt is convertible directly to the copper salt by washing the alkali salt form with an aqueous solution of a water-soluble copper salt, such as copper sulfate or cupric chloride. The resin is then thoroughly washed to remove soluble salts therefrom. If the copper salt and the resin in hydrogen form are to be used in a powder, they are dried. For use in lotions, creams, or ointments drying is not necessary.

For example, a finely powdered water-insoluble copolymer from acrylic acid and 2% of divinylbenzene is converted to its sodium salt with dilute soda ash solution. The resin is washed free of alkalinity, treated with a 5% solution of copper sulfate, thoroughly washed with de-ionized water, and air dried.

A typical ointment may be prepared in the following way. An ointment base is made from 30 parts by weight of glyceryl monostearate, 30 parts of glyceryl laurate, 60 parts of stearic acid, 300 parts of water, preservative (such as a mixture of propyl and methyl p-hydroxybenzoate at 0.05%), and perfume. There are mixed 86 parts by weight of this base, 4 parts of a copper carboxylate resin from acrylic acid and divinylbenzene, and 10 parts of this resin in hydrogen form, these resins being saturated with water before being mixed. The product has a pH of 5.

Another typical base is made from 250 parts of cetyl-stearyl alcohols, 250 parts of white mineral oil, 120 parts of propylene glycol, 15 parts of emulsifying agent, 0.25 part of methyl p-hydroxybenzoate, 0.15 part of propyl p-hydroxybenzoate, and 365 parts of water. A portion of 80 parts of this base is mixed with 8 parts of water-wet copper salt of a carboxylic resin from methacrylic acid, styrene, and divinylbenzene and with 12 parts of this carboxylic resin in hydrogen form.

Another ointment was made from an aqueous hydrophilic base from waxy polyethylene glycol, five parts of the above cupric carboxylate and 10 parts of the above acidic carboxylic resin being blended with 85 parts of this base.

A typical lotion base is made by warming 50 parts of a 2% quince seed mucilage and adding thereto a warm mixture prepared by combining 5 parts of glycerine, 0.3 part of triethanolamine, 3.4 parts of ethyl alcohol, and 39 parts of water and combining this mixture after being heated with a hot mixture of 1.2 parts of stearic acid, 0.3 part of ricinoleic acid, 0.5 part of sweet almond oil, and 0.3 part of glyceryl monostearate. To 82 parts of this base there are added 12 parts of a carboxylic exchanger from methacrylic acid and polyvinylbenzene and 6 parts of this resin in its copper salt form.

A composition is prepared from 10 parts of a carboxylic cation-exchange resin in the form of its copper salt, 25 parts of a carboxylic cation-exchange resin in its hydrogen form, and 65 parts of hydrophilic base prepared from cetyl alcohol 5%, stearic acid 8%, non-ionic wetting agents 16%, and water 71%.

Another ointment is prepared by mixing 10 parts of the above copper salt resin, 20 parts of the above carboxylic resin in hydrogen form, and 70 parts of petroleum oil gelled with about 5% polyethylene. A hydrophobic system of this type is useful where slow and prolonged action is desired.

Useful dusting powders can be based on the following typical formulations: 50 parts of finely powdered carboxylic exchange resin in hydrogen form from methacrylic acid, styrene, and divinylbenzene, 15 parts of the copper salt of this same resin, 30 parts of talc, and 5 parts of starch; 20 parts of carboxylic exchanger from methacrylic acid and polyvinylbenzene in its acid form, 10 parts of the copper salt of this resin, 10 parts of fine, white clay, 5 parts of zinc stearate, 5 parts of starch, and 50 parts of perfumed starch; 15 parts of an exchange resin from methacrylic acid and divinylbenzene in the resin's hydrogen form, 10 parts of the copper salt of an exchange resin from methacrylic acid and polyvinylbenzenes, and 75 parts of a powder base prepared with 10% of kaolin, 6% of titanium white, 80% of talc, 1% of a non-ionic wetting agent, and 3% of undecylenic acid.

The compositions of this invention are useful in overcoming the irritation and discomfort of various dermatomycotic infections including onychomycosis and permitting normal growth and healing to proceed. Although the copper carboxylate resins are highly insoluble and by themselves are not truly effective, the compositions become effective and useful which contain in the ratios defined above both copper carboxylate resin and the acid-form of the carboxylic cation exchangers within the prescribed pH range.

This application is a continuation-in-part of my applications Serial Numbers 187,356 and 187,358, filed September 28, 1950 both now abandoned.

I claim:

1. A therapeutic composition comprising in admixture a finely particled carboxylic cation-exchange resin in the form of its copper salt and a finely particled carboxylic cation-exchange resin in its hydrogen form, the latter forming at least 2% of the composition.

2. A therapeutic composition comprising a finely particled carboxylic cation-exchange resin in the form of its copper salt and a finely particled carboxylic cation-exchange resin in acid form, the latter composing 2% to 60% of the composition and the former 2% to 40% of the composition.

3. A therapeutic composition comprising a finely particled carboxylic cation-exchange resin in the form of its copper salt, a finely particled carboxylic cation-exchange resin in acid form, and a carrier, the latter resin composing to 2% to 40% of the total composition.

4. A therapeutic composition comprising 4% to 20% of a finely particled carboxylic cation-exchange resin in the form of its copper salt, 2% to 40% of a finely particled carboxylic cation-exchange resin in hydrogen form, and carrier to make 100%.

5. A therapeutic composition comprising 4% to 20% of a finely particled carboxylic cation-exchange resin in the form of its copper salt, 4% to 40% of a finely particled carboxylic cation-exchange resin in hydrogen form, and an ointment base in amount to make 100%.

6. A therapeutic composition comprising 4% to 20% of a finely particled carboxylic cation-exchange resin in the form of its copper salt, 4% to 40% of a finely particled carboxylic cation exchange resin in hydrogen form, and finely particled, water-insoluble, inert powder in an amount to make 100%.

References Cited in the file of this patent

UNITED STATES PATENTS

| | | |
|---|---|---|
| 2,501,927 | Block | Mar. 28, 1950 |
| 2,653,902 | Thurman | Sept. 29, 1953 |

OTHER REFERENCES

New and Nonofficial Remedies, 1951, J. P. Lippincott, pp. XXVII–XXXI.

Czetsch-Lindenwald Salben, Puder Externa, 3rd Edition, Springer, Berlin, 1950, pp. 236-7.